United States Patent
Kondo (12)

(10) Patent No.: US 6,241,339 B1
(45) Date of Patent: Jun. 5, 2001

(54) METHOD OF AND APPARATUS FOR CORRECTING PRINT GRADATION, COLOR CONVERTING APPARATUS WITH GRADATION CORRECTION, METHOD OF ADJUSTING DOT GAIN IN PRINT, AND PROOFER USED THEREIN

(75) Inventor: Hirokazu Kondo, Minamiashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/211,050

(22) Filed: Dec. 15, 1998

(30) Foreign Application Priority Data

Dec. 17, 1997 (JP) .................................... 9-347852

(51) Int. Cl.[7] ................ B41J 2/21; B41B 15/00

(52) U.S. Cl. .................................... 347/43; 358/1.1

(58) Field of Search ................ 347/43, 14, 23; 358/1.1

(56) References Cited

U.S. PATENT DOCUMENTS 6,075,614 * 6/2000 Ohtsuka et al. ................ 358/1.1

* cited by examiner

Primary Examiner—Thinh Nguyen
(74) Attorney, Agent, or Firm—Sughrue, Mion, Zinn, Macpeak & Seas, PLLC

(57) ABSTRACT

An adjustment process for converting the dot gain of printing conditions of a given standard printing profile to the dot gain of printing conditions of a printing machine which is going to be used is facilitated. For example, with respect to the color cyan C, the printing profile is divided into a linear four-dimensional LUT for color conversion and a gradation characteristic inherent in the printing profile, i.e., an LUT of dot gain characteristics. The characteristic of an inverse function of the gradation characteristic inherent in the printing profile is set in a LUT for gradation characteristic conversion such that a change in output halftone-dot % of the LUT of the gradation characteristic inherent in the printing profile will be equalized to a change in input halftone-dot % of the LUT. In this manner, the input halftone-dot % and the output halftone-dot % agree with each other, allowing the adjustment process to match the user's sensitivity.

20 Claims, 5 Drawing Sheets

METHOD OF AND APPARATUS FOR CORRECTING PRINT GRADATION, COLOR CONVERTING APPARATUS WITH GRADATION CORRECTION, METHOD OF ADJUSTING DOT GAIN IN PRINT, AND PROOFER USED THEREIN

BACKGROUND OF THE INVENTION

1. Field of the Invention

The present invention relates to a method of and an apparatus for correcting print gradation, a color correcting apparatus with gradation correction, a method of adjusting dot gains in print, and a proofer such as a color printer or the like, for use in a proof generating system which generates a color proof comprising a color image printed on a proof sheet with the proofer, before a colored printed material is produced using a print sheet by a color printing machine such as a rotary press or the like.

2. Description of the Related Art

It has heretofore been customary to generate a color proof for examining colors and making color corrections with a proofer such as a color printer or the like before a colored printed material with a color image in the form of a halftone-dot image printed on a print sheet as a final product is produced by a color printing machine.

The proofer is used because it does not require films and printing plates (presensitized plates) to be produced and can easily generate a plurality of hard copies or color proofs within a short period of time.

For forming a color image on a proof sheet, image data depending on a device such as a printing machine, a camera, an image sensor, a CRT, an LED, etc., e.g., C, M, Y, K (cyan, magenta, yellow, black) image data, are converted to calorimetric data independent of a device, e.g., X, Y, Z (stimulus value) data, according to a standard printing profile (a four-dimensional lookup table or the like) given by a printer manufacturer or the like. Then, the device-independent colorimetric data are converted to device-dependent image data for a color printer, e.g., R, G, B (red, green, blue) image data, according to a proofer profile, e.g., a printer profile (a three-dimensional lookup table). Using the device-dependent image data, a color proof with a color image formed on a proof sheet is generated by a color printer which is also referred to as a proof printer.

In this manner, the colors of a printed material to be produced by the printing machine can be simulated by the color proof thus generated before the printed material is actually produced.

However, it often happens for the standard printing profile to fail to match printing properties, i.e., printing conditions depending on inks, papers, and printing machine characteristics, of the printing machine which will actually be used to print the color image.

Specifically, the printing conditions vary depending on many parameters which include not only inks, papers, printing machine types, but also production lots and ambient temperatures even when the same inks, paper, and printing machine are used. It is impossible for the standard printing profile to fully match actual printing conditions used by the user, i.e., desired printing conditions. It is therefore necessary to adjust the printing profile according to actual printing conditions, i.e., desired printing conditions, rather than standard printing conditions.

Inks and papers that are in general use are limited to certain types. Therefore, solid ink colors and paper colors are relatively stable even under different printing conditions. However, intermediate color tones may vary greatly depending on conditions in which color images are printed by an actual printing machine. For adjusting such intermediate color tones, it has been the practice to insert one-dimensional lookup tables for the respective colors C, M, Y, K to adjust C, M, Y, K tone curves (also referred to as gradation characteristics or dot gains) prior to the four-dimensional lookup table as the standard printing profile, and convert the respective colors C, M, Y, K to C', M', Y', K', respectively, for color correction.

However, since the four-dimensional lookup table contains an inherent dot gain under the standard printing conditions, adjustments made to the C, M, Y, K tone curves in the one-dimensional lookup tables for the respective colors C, M, Y, K with respect to the desired printing conditions, i.e., changes in input halftone-dot %, do not agree with changes in output halftone-dot % of the inherent dot gain. Consequently, the user needs to be highly skilled to adjust the tone curves actually.

SUMMARY OF THE INVENTION

It is therefore an object of the present invention to provide a method of and an apparatus for correcting a print gradation, a method of adjusting dot gains in print, and a proofer to allow the user to bring the gradation (dot gain) characteristics of a given printing profile and the gradation (dot gain) characteristics of desired printing conditions easily into agreement with each other in a manner to match the user's sensitivity.

Another object of the present invention is to provide a color converting apparatus which incorporates a print gradation correcting apparatus for allowing the user to bring the gradation (dot gain) characteristics of a given printing profile and the gradation (dot gain) characteristics of desired printing conditions easily into agreement with each other in a manner to match the user's sensitivity, and which is capable of generating image data dependent on an image output device for outputting a proof.

The above and other objects, features and advantages of the present invention will become more apparent from the following description when taken in conjunction with the accompanying drawings in which a preferred embodiments of the present invention is shown by way of illustrative example.

DETAILED DESCRIPTION OF THE PREFERRED EMBODIMENT

Figure 1:
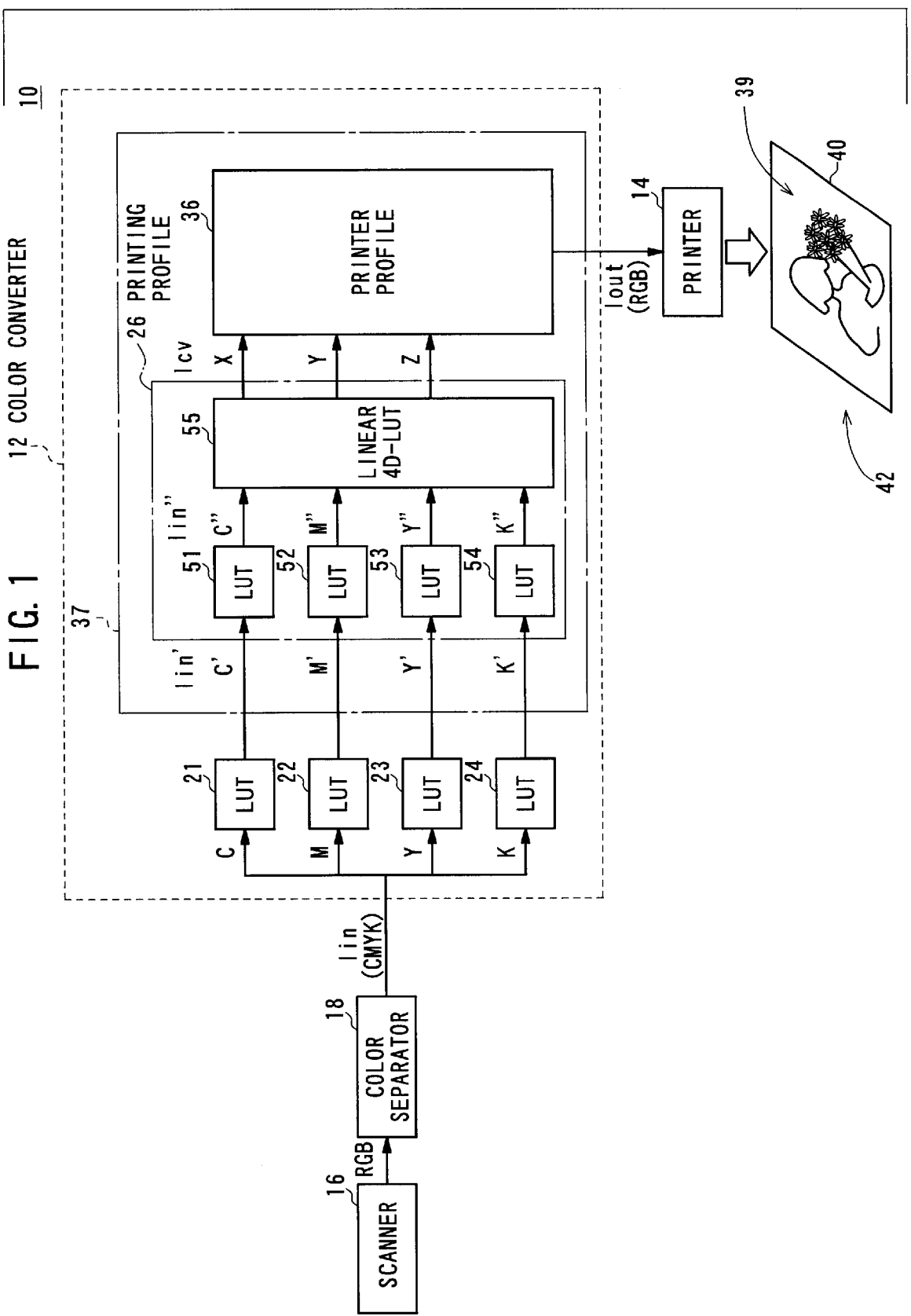
FIG. 1 is a block diagram of a proof generating system to which the principles of the present invention are applied.

As shown in FIG. 1, a proof generating system 10 to which the principles of the present invention are applied has a color converter 12 in the form of a computer. The color converter 12 converts image data depending on an input device, e.g., C, M, Y, K image data Iin=Iin (C, M, Y, K) to be printed, each of halftone-dot % data, to device-dependent image data, e.g., R, G, B image data Iout=Iout (R, G, B), and outputs the R, G, B image data to an image output device as a proofer body, e.g., a printer 14. In this embodiment, the proofer comprises the color converter 12 and the printer 14 as the proofer body.

The C, M, Y, K image data Iin are image data generated by a color separator 18 which converts R, G, B image data generated by an image input device, e.g., a scanner 16, according to a three-color to four-color conversion process (RGB→CMYK) to suit printing properties. The color separator 18 makes known color corrections, gradation corrections, and other corrections, which will not be described in detail below as they do not have a direct bearing on the present invention.

The color converter 12 connected to an output terminal of the color separator 18 has one-dimensional conversion lookup tables (LUTs) 21 through 24 for effecting gradation conversion on each of the colors C, M, Y, K of the C, M, Y, K image data Iin from the color separator 18, and a standard printing profile (first color converting means) 26 for converting gradation-converted image data Iin' (C', M', Y', K') from the LUTs 21 through 24 to X. Y, Z calorimetric data Icv=Icv (X, Y, Z) as first calorimetric data which are device-independent image data.

The standard printing profile 26, which is a nonlinear four-dimensional LUT, is divided into a colorimetrically-linear four-dimensional LUT 55 and LUTs 51 through 54 for the respective colors C, M, Y, K which represent nonlinear inherent gradation (dot gain) characteristics.

The color converter 12 further has a printer profile (second color converting means) 36 for converting the X, Y, Z colorimetric data Icv from the printing profile 26 to the R, G, B image data Iout=Iout (R, G, B).

When the R, G, B image data Iout are supplied to the printer 14, the printer 14 generates a proof 42 which carries a color image 39 on a color sheet 40 that is a dedicated proof print medium.

The printer 14 may comprise a laser beam printer which scans the color sheet 40 with R, G, B laser beams intensity-modulated by the R, G, B image data Iout to record latent images, and develops the recorded latent images into visible R, G, B images. The color sheet 40 hereinafter refers to a developed color sheet.

Processes of generating the LUTs 21 through 24 for correcting gradation (dot gain) characteristics, the standard printing profile 26, and the printer profile 36 will be described below.

The printer profile 36 is given by a printer manufacturer or the like. For generating the printer profile 36, color patches of combinations of the colors R, G, B of the R, G, B image data Iout, each ranging from a zero value to a maximum value, are produced on the color sheet 40, and measured by a calorimeter to determine X, Y, Z calorimetric data. Then, a conversion table between the R, G, B image data and the X, Y, Z colorimetric data is generated. The generated conversion table is inversely converted and interpolated, if necessary, thereby producing a LUT as the printer profile 36 for converting X, Y, Z colorimetric data (the calorimetric data Icv' in FIG. 1) to R, G, B image data Iout.

The printing profile 26 is also given by a printer manufacturer or the like. The printing profile 26 is a calorimetric table of values of C, M, Y, K halftone-dot % data at certain intervals. For generating a calorimetric table of values of C, M, Y, K halftone-dot % data at intervals of 10%, for example, it is necessary to determine a total of $11^4=14641$ calorimetric values of the four colors C, M, Y, K at 0, 10, ..., 100 halftone-dot %. Actually, however, several hundred representative colors of these 14641 calorimetric values are printed as a chart on a standard print sheet by a standard printing machine, and then calorimetrically measured to generate a calorimetric table of values of C, M, Y, K halftone-dot % data at intervals of 10% as the standard printing profile 26, which is a nonlinear four-dimensional LUT for converting the image data Iin' (C', M', Y', K') to the colorimetric data Icv (X, Y, Z).

Figure 2:
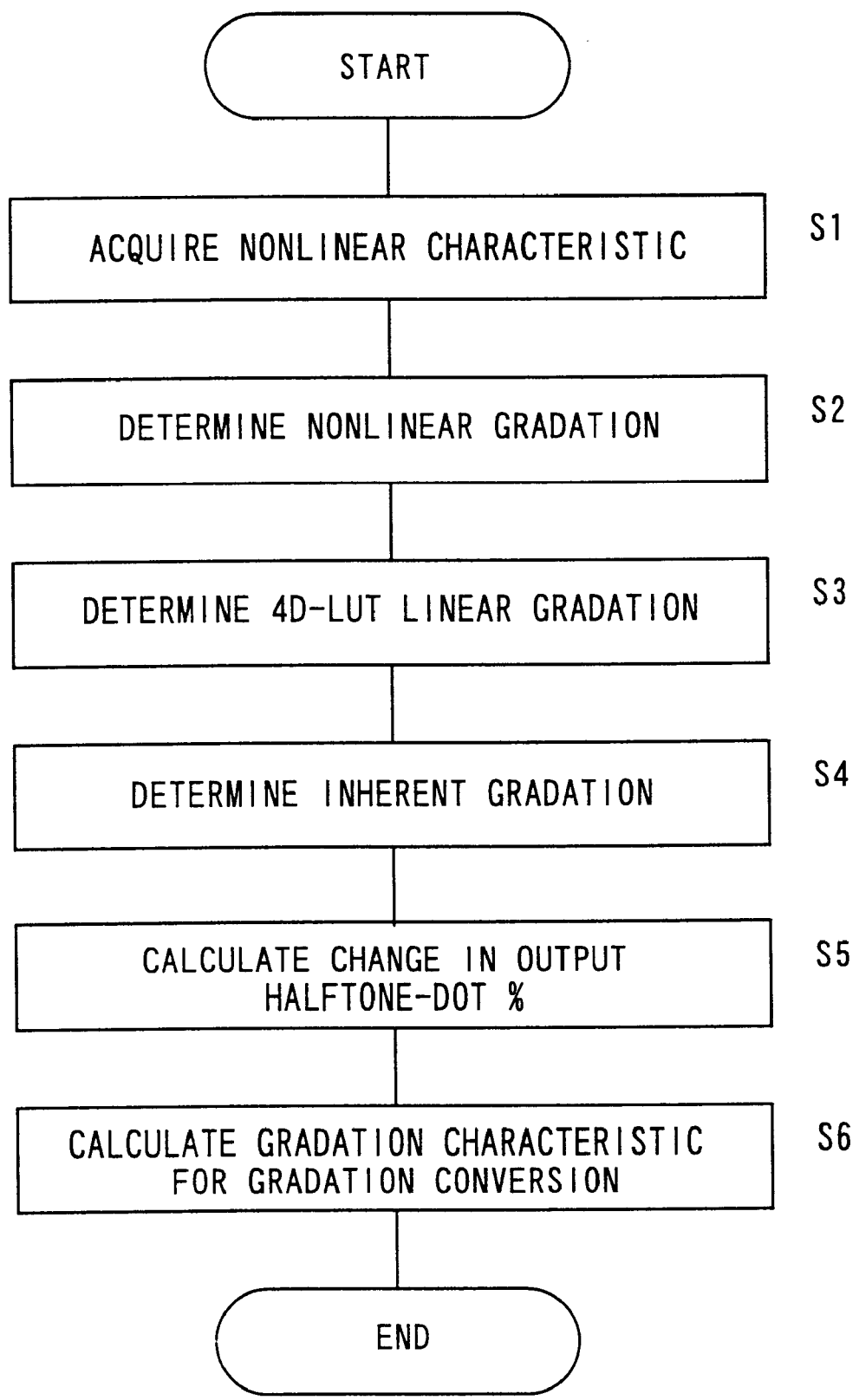
FIG. 2 is a flowchart of a gradation characteristic generating process for converting the gradation under standard printing conditions into the gradation under desired printing conditions.

A process of generating the one-dimensional conversion lookup tables (LUTs) 21 through 24 for effecting gradation (dot gain) conversion will be described below with reference to FIG. 2. The LUT 21 for the monochromatic color of cyan C will be described below. The other LUTs 22, 23, 24 for the respective monochromatic colors of magenta M, yellow Y, and black K can be generated in the same manner as with the LUT 21 for the monochromatic color of cyan C. In FIG. 2, numerals with a suffix "S" represent step numbers of the process.

The given standard printing profile 26 is a nonlinear four-dimensional LUT. Of the C, M, Y, K image data Iin (C, M, Y, K) supplied to the standard printing profile 26, the image data M, Y, K are set to M=Y=K=0% and the image data C is incremented from C=0% at given intervals for thereby producing output calorimetric values X, Y, Z. In this manner, nonlinear colorimetric conversion characteristics with respect to the monochromatic cyan C (C halftone-dot %→colorimetric values X, Y, Z) are acquired in step S1.

Figure 3:
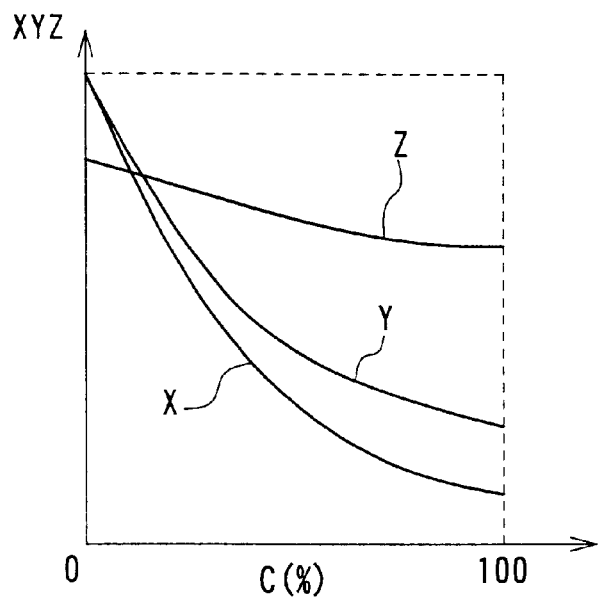
FIG. 3 is a diagram showing halftone-dot % calorimetric value conversion characteristics determined from a standard printing profile.

FIG. 3 shows the nonlinear colorimetric conversion characteristics X, Y, Z thus acquired of the cyan C. Of the acquired colorimetric conversion characteristics X, Y, Z, an element v where the difference between C=0% (which represents the color of paper that is usually white) and C=100% (which represents a solid color) (v=X in FIG. 3) is selected, and the nonlinear characteristic (gradation) of cyan (input) C with respect to changes in the element (output) v is determined as P1 (%) (see FIG. 4) in step S2.

Since the output v represented by the vertical axis relative to the calorimetric values X, Y, Z is a variable and the gradation P1 (%) represented by the horizontal axis relative to the halftone-dot % of cyan (input) C, the gradation (nonlinear four-dimensional LUT) P1 (%) may be expressed by the following equation (1):

$$P1(\%)=P1(v) \tag{1}$$

If the calorimetric value at the cyan C=0% is represented by vW and the colorimetric value at the cyan C=100% is represented by vS (see FIG. 4), a linear characteristic (gradation) of the input C with respect to changes in the output v is determined as a gradation (linear four-dimensional LUT) P0 (%) in step S3.

Figure 4:
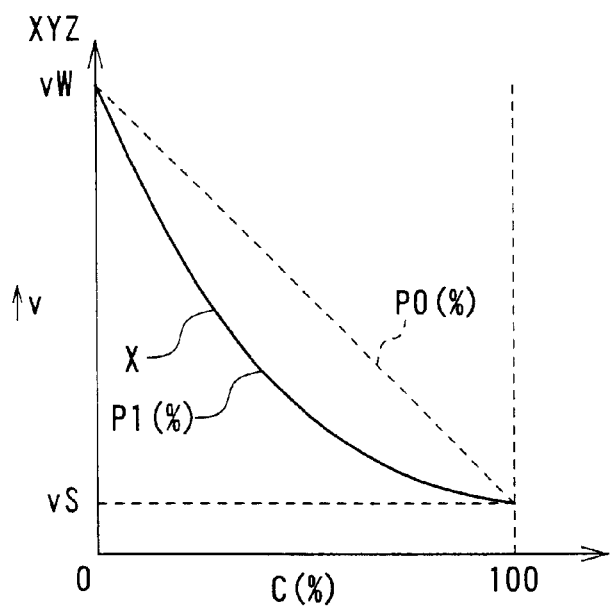
FIG. 4 is a diagram showing a halftone-dot % colorimetric value conversion characteristic as it is divided into a linear component and a nonlinear component.

It can readily be understood from FIG. 4 that the linear gradation characteristic P0 (%) is given according to the following equation (2):

$$P0(\%)=(vW-v)/(vW-vS) \tag{2}$$

Figure 5:
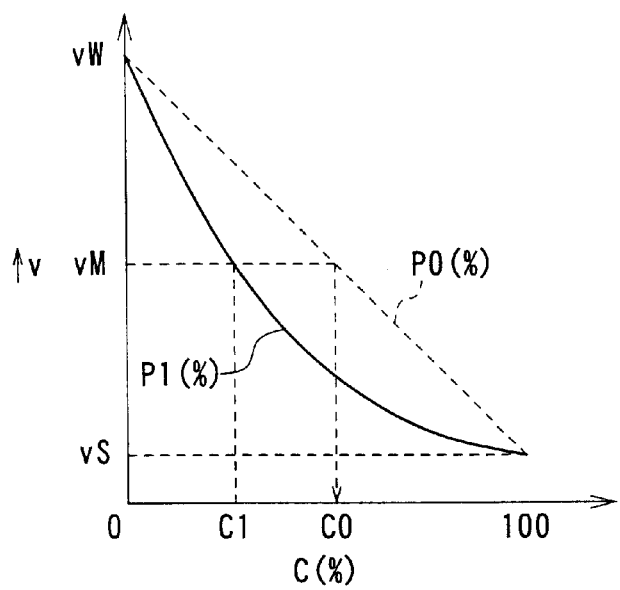
FIG. 5 is a diagram showing the manner in which a gradation characteristic inherent in standard printing conditions is determined.

The nonlinear gradation P1 (%) expressed by the equation (1) serves as a table for converting the colorimetric value (output) v, e.g., v=vM, to a halftone-dot % value C=C1 of the cyan C, as shown in FIG. 5. It may otherwise be regarded as a table for converting the halftone-dot % value C=C1 to the colorimetric value v=vM.

The linear gradation P0 (%) expressed by the equation (2) serves to convert the calorimetric value v=vM to halftone-dot % value C=C0.

Figure 6:
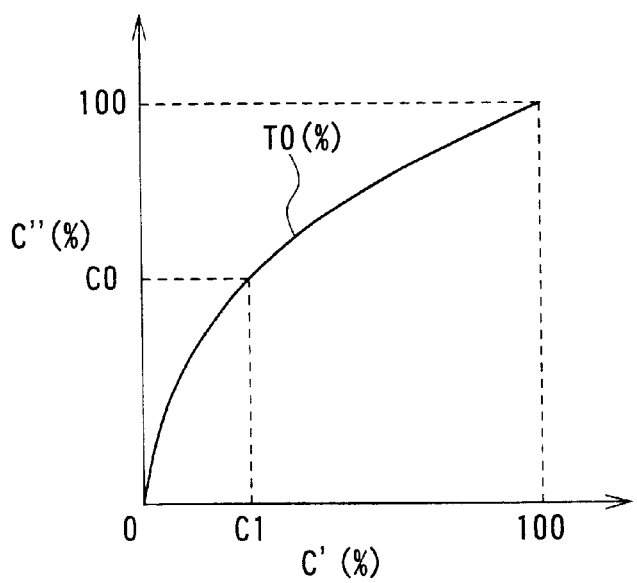
FIG. 6 is a diagram showing the determined inherent gradation characteristic.

As shown in FIG. 1, with respect to the cyan C, the standard printing profile 26 is divided into the LUT 51 which is the characteristic of an inherent gradation (dot gain) contained in the standard printing conditions, and the linear four-dimensional LUT 55 that serves as a linear color converting means for input halftone-dot % data C'. The gradation of the linear four-dimensional LUT 55 corresponds to the gradation P0. If the gradation (dot gain) of the LUT 51 which is the characteristic of a gradation inherent in the standard printing profile 26 is represented by a gradation T0 (%), then taking into account signs at the input and output of the LUT 51, the gradation T0 (%) needs to convert an input halftone-dot % value C'=C1 to an output halftone-dot % value C"=C0 (see FIG. 6).

The gradation T0 (%) is determined according to the following equation (3) in step S4:

$$T0(\%) = P0(P1(C')) \tag{3}$$

The equation (3) indicates that when the input halftone-dot % value C' is C'=C1, P1 (C')=P1 (C1)=vM, and the colorimetric value vM is converted to the halftone-dot % value C0(=C") as T0=P0(vM)=C0.

As a result, using the inherent gradation T0 (%) set in the LUT 51 and the linear gradation P0 (%) of the linear four-dimensional LUT 55 is equivalent to the standard printing profile 26 for converting the halftone-dot % value C' to the calorimetric values X, Y, Z.

Figure 7:
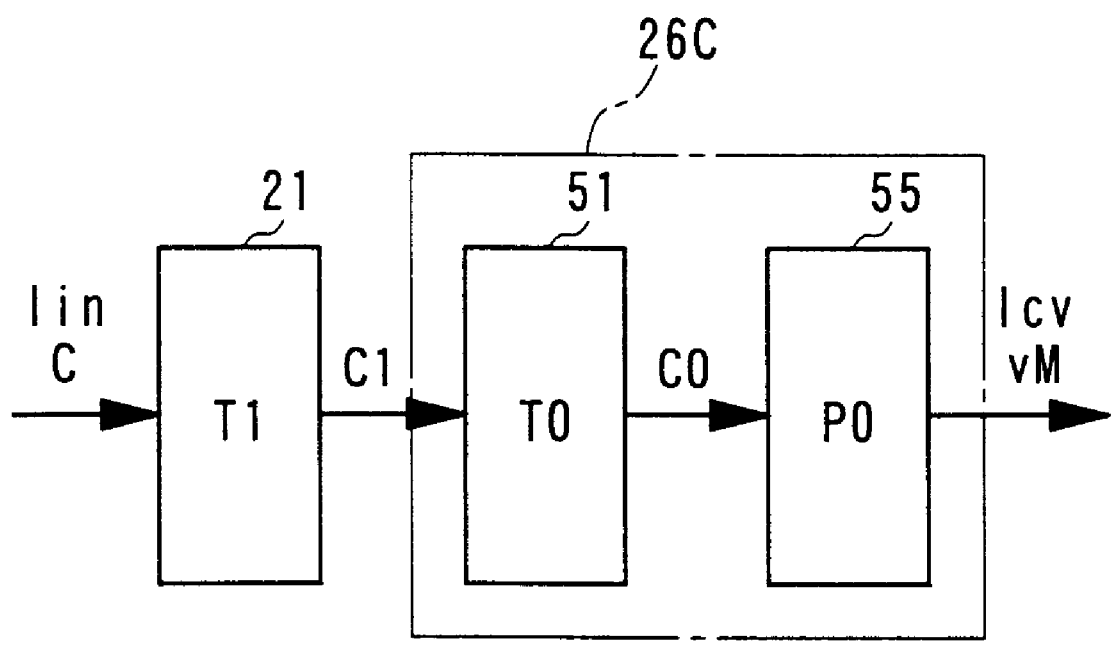
FIG. 7 is a diagram showing a process of determining a function to equalize a change in output halftone-dot % with a change in input halftone-dot %.

It is assumed that a gradation (characteristic) set in the LUT 21 is represented by T1 (%). As shown in FIG. 7, after the halftone-dot % value C of the cyan C of the input data Iin is converted to a halftone-dot % value C1 by the gradation T1 (%) of the LUT 21, it is converted to a halftone-dot % value C0 by the inherent gradation T0 (%) in the printing profile 26 relative to the cyan C (represented by 26C in FIG. 7), and thereafter converted to a calorimetric value vM by the gradation P0 (%) of the linear four-dimensional LUT 55.

It is preferable that a change in the gradation at the input of the LUT 21 (gradation T1 (%)) be equal to a change Δ % in the gradation at the output of the LUT 51 (gradation T0 (%)) in view of the user's sensitivity. This is because the difference between the dot gains of printing conditions of the standard printing profile 26 and printing conditions (desired printing conditions) of a printing machine which is going to be used, i.e., the difference between intermediate color tone gradations, may be directly considered to be a change Δ % which is an adjustment to be made by the user to the input of the LUT 21.

The above preferable requirement can be met as follows: If the LUT 21 (gradation T1 (%)) were not present in FIG. 7, when the halftone-dot % value C is adjusted by the LUT 51 (gradation T0 (%)), the LUT 51 (gradation T0 (%)) outputs T0 (%)=T0 (C). When the halftone-dot % value C is adjusted successively by the LUT 21 (gradation T1 (%)) and the LUT 51 (gradation T0 (%)), the LUT 51 (gradation T0 (%)) outputs T0 (T1 (%))=T0 (T1 (C)). Therefore, a change Δ % in the output halftone-dot % at this time is expressed by the following equation (4) in step S5:

$$\Delta \% = T0(T1(\%)) - T0(\%) \tag{4}$$

In order to equalize a change in the gradation at the input of the LUT 21 (gradation T1 (%)) to a change Δ % in the gradation at the output of the LUT 51 (gradation T0 (%)), the characteristic of an inverse function $T0^{-1}$ (Δ %+T0 (%)) given by the following equation (5) obtained by solving the above equation (4) for the gradation T1 (%) may be set in the LUT 21 (gradation T1) in step S5:

$$T1(\%) = T0^{-1}(\Delta \% + T0(\%)) \tag{5}$$

By setting the gradation characteristic expressed by the equation (5) in the LUT 21 (gradation T1), a change in the gradation at the input of the LUT 21 (gradation T1 (%)) is equalized to a change Δ % in the gradation at the output of the LUT 51 (gradation T0 (%)), making it possible to make adjustments matching the user's sensitivity.

Consequently, even if printing conditions of the given standard printing profile 26 and printing conditions (desired printing conditions) of a printing machine which is going to be used are different from each other, respective inverse functions of the LUTs 51 through 54 having gradation characteristics inherent in the standard printing profile 26 are set as gradation characteristics in the LUTs 21 through 24 as gradation converting means for thereby equalizing user's adjustments to the halftone-dot %, i.e., changes in the input halftone-dot %, to changes in the halftone-dot % in the printing profile 26, i.e., changes in the output halftone-dot %, with the result that the accuracy of the proof generating system 10 can be increased.

In the above embodiment, as shown in FIGS. 3 and 4, input vs. output characteristics for the respective colors C, Y, M, K are determined from the standard printing profile 26 generated under the standard printing conditions, and the inherent gradation characteristic T0 (%) (see FIG. 6) is generated on the basis of the gradation characteristic of any of the colorimetric values X, Y, Z where the difference between output calorimetric values at 0 and 100 halftone-dot W of each of the colors C, Y, M, K according to the determined input vs. output characteristics is maximum. However, there may be employed weighted mean values of the gradation characteristics of the output calorimetric values X, Y, Z shown in FIG. 3 depending on characteristics (lightness and tint) of the input image data Iin.

Further, each of the printing profile 26 as color converting means and the LUTs 21 through 24 as gradation converting means can be regarded as mapping from a mathematical point of view. Stated otherwise, the printing profile 26 can be defined as a first conversion definition, given against the predetermined printing conditions which determines calorimetric values with regard to arbitrary combination of values of C, M, Y, K halftone-dot % values, while the LUTs 21 through 24 can be defined as a second conversion definition which varies gradation characteristics on each of the colors C, M, Y, K. In the second conversion definition, the dot gains are determined so as to relate to the dot gains according to the first conversion definition. The dot gains of the second conversion definition are shown as changes in input halftone-dot %, and also relate to desired printing conditions.

Still further, a synthetic LUT 37 as color converting means (synthetic color converting means) is determined by combining at least the first given conversion definition of the printing profile 26, the second generated conversion definition of the LUTs 21 through 24, and a third conversion definition defined by the printer profile 36 which determines the combination of values for determining the colors of the printer with respect to arbitrary colorimetric values. The synthetic LUT 37 realizes fast conversion in the color converter 12, by converting the input image data Iin as input halftone-dot % data into the R, G, B image data Iout as the combination data of values for determining the colors of the printer 14.

According to the present invention, as described above, for causing given standard printing conditions to match desired printing conditions, a change in output halftone-dot % is equalized to a change in input halftone-dot % as an adjustment no matter what the desired printing conditions may be. Therefore, in usual cases where the gradation characteristics of standard printing conditions differ from the gradation characteristics of desired printing conditions, the gradation of the standard printing conditions can be equalized to the gradation of the desired printing conditions in a manner to meet the user's sensitivity. Therefore, the user can easily equalize the gradation of the standard printing conditions to the gradation of the desired printing conditions without having to be skilled.

Specifically, gradation converting means for the respective colors C, M, Y, K are placed in front of color converting means generated under standard printing conditions for converting device-dependent C, M, Y, K halftone-dot % data to calorimetric data, and gradation conversion characteristics set in the respective gradation converting means for the respective colors C, M, Y, K are generated such that changes in input halftone-dot % with respect to halftone-dot % image data for the respective colors C, M, Y, K will be equalized to changes in output halftone-dot % of gradation characteristics inherent in the color converting means.

Therefore, even when the gradation (dot gain) characteristics of a given printing profile are not in agreement with the gradation (dot gain) characteristics of desired printing conditions, they can be equalized to each other in a manner to meet the user's sensitivity.

The color converting means generated under standard printing conditions is divided into gradation characteristics inherent in the respective colors C, M, Y, K and a linear color converting means, and inverse functions of the inherent gradation characteristics are determined. Characteristics according to the inverse functions are set as gradation characteristics in the gradation converting means. In this fashion, the gradation characteristics can easily be generated.

Input vs. output characteristics of the color converting means generated under standard printing conditions are determined for the respective colors C, Y, M, K, and the inherent gradation characteristics are generated on the basis of gradation characteristics where the difference between output colorimetric values at 0 and 100 halftone-dot % of each of the colors C, Y, M, K according to the determined input vs. output characteristics is maximum, or on the basis of gradation characteristics determined by weighted mean values of the output calorimetric values, i.e., input vs. output characteristics on each of the colors C, M, Y, K.

Furthermore, colorimetric data X, Y, Z which are device-independent image data converted by the printing profile 26 are converted to device-dependent image data R, G, B for the printer 14 by the printer profile 36. When the device-dependent image data R, G, B are supplied to the printer 14, the printer 14 generates a proof 42 matching the printing profile 26.

Although a certain preferred embodiment of the present invention has been shown and described in detail, it should be understood that various changes and modifications may be made therein without departing from the scope of the appended claims.

What is claimed is:

1. A method of correcting print gradation, comprising the steps of:

converting device-dependent C, M, Y, K halftone-dot % data to colorimetric data with color converting means generated on the basis of standard printing conditions and having gradation characteristics inherent in the standard printing conditions;

placing gradation converting means for respective colors C, M, Y, K for converting the C, M, Y, K halftone-dot % data to gradation characteristics corresponding to desired printing conditions, in front of said color converting means; and generating gradation characteristics set in said gradation converting means for the respective colors C, M, Y, K such that a change in input halftone-dot % of the gradation characteristics will be equalized to a change in output halftone-dot % of gradation characteristics inherent in said color converting means.

2. A method according to claim 1, further comprising the steps of:

dividing said color converting means generated on the basis of the standard printing conditions into gradation characteristics inherent in said color converting means for the respective colors C, M, Y, K and a linear color converting means; and determining inverse functions of said gradation characteristics inherent in said color converting means, and using characteristics according to said inverse functions as gradation characteristics set in said gradation converting means.

3. A method according to claim 2, further comprising the steps of:

determining input vs. output characteristics of said color converting means generated under the standard printing conditions for the respective colors C, Y, M, K; and generating said gradation characteristics inherent in said color converting means on the basis of gradation characteristics where a difference between colorimetric values of output calorimetric values at 0 and 100 halftone-dot % of each of the colors C, Y, M, K according to the determined input vs. output characteristics is maximum.

4. A method according to claim 2, further comprising the steps of:

determining input vs. output characteristics of said color converting means generated under the standard printing conditions for the respective colors C, Y, M, K; and generating said gradation characteristics inherent in said color converting means on the basis of gradation characteristics determined by weighted mean values of output colorimetric values at 0 and 100 halftone-dot % of each of the colors C, Y, M, K according to the determined input vs. output characteristics.

5. A method according to claim 1, further comprising the steps of:

determining input vs. output characteristics of said color converting means generated under the standard printing conditions for the respective colors, C, Y, M, K; and generating said gradation characteristics inherent in said color converting means on the basis of gradation characteristics where a difference between calorimetric values of output colorimetric values at 0 and 100 halftone-dot % of each of the colors C, Y, M, K according to the determined input vs. output characteristics is maximum.

6. An apparatus for correcting print gradation, comprising:

gradation converting means for respective colors C, M, Y, K for converting device-dependent C, M, Y, K halftone-dot % data to gradation characteristics corresponding to desired printing conditions; and color converting means for converting the gradation-converted C, M, Y, K halftone-dot % data to calorimetric data;

said color converting means being generated on the basis of standard printing conditions and having gradation characteristics inherent in the standard printing conditions;

the arrangement being such that gradation characteristics set in said gradation converting means for the respective colors C, M, Y, K are generated such that a change in input halftone-dot % of the gradation characteristics will be equalized to a change in output halftone-dot % of gradation characteristics inherent in said color converting means.

7. An apparatus according to claim 6, wherein said color converting means generated on the basis of the standard printing conditions is divided into gradation characteristics inherent in said color converting means for the respective colors C, M, Y, K and a linear color converting means, and characteristics according to inverse functions of said gradation characteristics inherent in said color converting means are used as gradation characteristics set in said gradation converting means.

8. An apparatus according to claim 7, wherein input vs. output characteristics of said color converting means generated under the standard printing conditions are determined for the respective colors C, Y, M, K, and said gradation characteristics inherent in said color converting means are generated on the basis of gradation characteristics where a difference between colorimetric values of output colorimetric values at 0 and 100 halftone-dot % of each of the colors C, Y, M, K according to the determined input vs. output characteristics is maximum.

9. An apparatus according to claim 7, wherein input vs. output characteristics of said color converting means generated under the standard printing conditions are determined for the respective colors C, Y, M, K, said gradation characteristics inherent in said color converting means are generated on the basis of gradation characteristics determined by weighted mean values of output colorimetric values at 0 and 100 halftone-dot % of each of the colors C, Y, M, K according to the determined input vs. output characteristics.

10. An apparatus according to claim 6, wherein input vs. output characteristics of said color converting means generated under the standard printing conditions are determined for the respective colors C, Y, M, K, and said gradation characteristics inherent in said color converting means are generated on the basis of gradation characteristics where a difference between calorimetric values of output colorimetric values at 0 and 100 halftone-dot % of each of the colors C, Y, M, K according to the determined input vs. output characteristics is maximum.

11. A color converting apparatus, comprising:

gradation converting means for respective colors C, M, Y, K for converting device-dependent C, M, Y, K halftone-dot % data to gradation characteristics corresponding to desired printing conditions; and first color converting means for converting the gradation-converted C, M, Y, K halftone-dot % data to colorimetric data;

second color converting means for converting the calorimetric data to device-dependent image data for an image output device for outputting a proof;

said first color converting means being generated on the basis of standard printing conditions and having gradation characteristics inherent in the standard printing conditions;

the arrangement being such that gradation characteristics set in said gradation converting means for the respective colors C, M, Y, K are generated such that a change in input halftone-dot % of the gradation characteristics will be equalized to a change in output halftone-dot % of gradation characteristics inherent in said first color converting means.

12. A color converting apparatus according to claim 11, wherein said first color converting means generated on the basis of the standard printing conditions is divided into the gradation characteristics inherent in said first color converting means for the respective colors C, M, Y, K and a linear color converting means, and characteristics according to inverse functions of said gradation characteristics inherent in said first color converting means are used as gradation characteristics set in said gradation converting means.

13. A color converting apparatus according to claim 12, wherein input vs. output characteristics of said first color converting means generated under the standard printing conditions are determined for the respective colors C, Y, M, K, and said gradation characteristics inherent in said first color converting means are generated on the basis of gradation characteristics where the difference between colorimetric values of output colorimetric values at 0 and 100 halftone-dot % of each of the colors C, Y, M, K according to the determined input vs. output characteristics is maximum.

14. A color converting apparatus according to claim 12, wherein input vs. output characteristics of said first color converting means generated under the standard printing conditions are determined for the respective colors C, Y, M, K, said gradation characteristics inherent in said color converting means are generated on the basis of gradation characteristics determined by weighted mean values of output colorimetric values at 0 and 100 halftone-dot % of each of the colors C, Y, M, K according to the determined input vs. output characteristics.

15. A color converting apparatus according to claim 11, wherein input vs. output characteristics of said first color converting means generated under the standard printing conditions are determined for the respective colors C, Y, M, K, and said gradation characteristics inherent in said first color converting means are generated on the basis of gradation characteristics where a difference between colorimetric values of output colorimetric values at 0 and 100 halftone-dot % of each of the colors C, Y, M, K according to the determined input vs. output characteristics is maximum.

16. A method of adjusting dot gains in print comprising the steps of:

using a first conversion definition dot gains which is given against predetermined printing conditions and determines calorimetric values with regard to arbitrary combination of values of C, M, Y, K halftone-dot % values, and using a second conversion definition dot gains which is prior to said first conversion definition and varies gradation characteristics on each of the colors C, M, Y, K therein, wherein in said second conversion definition dot gains are determined so as to relate to dot gains according to said first conversion definition, said dot gains of the second conversion definition being shown as changes in input halftone-dot % of said second conversion definition, and also relating to desired printing conditions.

17. A method according to claim 16, wherein said second conversion definition is generated by the steps of:
   dividing said first conversion definition into the gradation characteristics inherent in the respective colors C, M, Y, K and a colorimetrically-linear color conversion definition, and
   determining said second conversion definition as inverse functions of said inherent gradation characteristics.

18. A method according to claim 17, wherein said inherent gradation characteristics are generated on the basis of the gradation characteristics of the calorimetric values where a difference between output colorimetric values at 0 and 100 halftone-dot % of each of the colors C, Y, M, K with said first conversion definition is maximum.

19. A method according to claim 17, wherein said inherent gradation characteristics are generated on the basis of the gradation characteristics determined by weighted mean values of the output colorimetric values of the gradation characteristics in the respective colors C, M, Y, K with said first conversion definition.

20. A method of adjusting dot gains in print comprising the steps of:

using a first conversion definition which is given against predetermined printing conditions and determines colorimetric values with regard to arbitrary combination of values of C, M, Y, K halftone-dot % values, and using a second conversion definition dot gains which is prior to said first conversion definition and varies gradation characteristics on each of the colors C, M, Y, K therein, wherein in said second conversion definition dot gains are determined so as to relate to dot gains according to said first conversion definition, said dot gains of the second conversion definition being shown as changes in input halftone-dot % of said second conversion definition, and also relating to desired printing conditions, and wherein a color converting means is determined by combining at least said first given conversion definition, the second generated conversion definition, and a third conversion definition which determines the combination of values for determining the colors of the printer with respect to arbitrary colorimetric values, and said color converting means converts said input halftone-dot % data into said combination of values for determining the colors of the printer.

* * * * *